US012583078B2

(12) United States Patent
Hofstee et al.

(10) Patent No.: US 12,583,078 B2
(45) Date of Patent: Mar. 24, 2026

(54) ROTARY MACHINE TOOL

(71) Applicants: Sander Hendrikus Johannes Hofstee, Wervik (NL); Jan Frederik Doddema, Paterswolde (NL)

(72) Inventors: Sander Hendrikus Johannes Hofstee, Wervik (NL); Jan Frederik Doddema, Paterswolde (NL)

(73) Assignee: MONTI-WERKZEUGE GMBH, Hennef (DE)

( * ) Notice: Subject to any disclaimer, the term of this patent is extended or adjusted under 35 U.S.C. 154(b) by 498 days.

(21) Appl. No.: 18/100,589

(22) Filed: Jan. 24, 2023

(65) Prior Publication Data

US 2023/0232976 A1     Jul. 27, 2023

(30) Foreign Application Priority Data

Jan. 26, 2022    (EP) ..................................... 22153482

(51) Int. Cl.
| | |
|---|---|
| *B24B 45/00* | (2006.01) |
| *F16B 21/04* | (2006.01) |
| *F16D 1/112* | (2006.01) |

(52) U.S. Cl.
CPC ............ *B24B 45/006* (2013.01); *F16B 21/04* (2013.01); *F16D 1/112* (2013.01); *Y10T 403/7007* (2015.01)

(58) Field of Classification Search
CPC ..... A46B 13/001; A46B 13/02; B24B 23/022; B24B 45/006; B24D 13/20; F16B 5/0092; F16B 5/10; F16B 7/20; F16B 21/02; F16B 21/04; F16D 1/112; Y10T 403/7005; Y10T 403/7007

USPC ................................................... 403/348, 349
See application file for complete search history.

(56) References Cited

U.S. PATENT DOCUMENTS

| | | | | |
|---|---|---|---|---|
| 5,177,830 A | | 1/1993 | Montabaur | |
| 5,386,608 A | * | 2/1995 | Montabaur | .......... A46B 13/001 |
| | | | | 15/179 |
| 5,524,315 A | | 6/1996 | Montabaur | |
| 7,192,338 B2 | | 3/2007 | Kausch | |
| 7,901,274 B2 | | 3/2011 | Montabaur | |
| 8,011,848 B2 | * | 9/2011 | Sockman | .............. B24B 45/006 |
| | | | | 403/348 |
| 9,554,642 B2 | | 1/2017 | Montabaur | |
| 10,807,211 B2 | | 10/2020 | Montabaur | |
| 11,168,823 B2 | * | 11/2021 | Attiwell | .................. F16D 1/112 |
| 11,346,401 B2 | * | 5/2022 | Jespersen | ................ F16D 1/112 |
| 2023/0276932 A1 | * | 9/2023 | Hofstee | ................ A46B 13/001 |

FOREIGN PATENT DOCUMENTS

| | | | |
|---|---|---|---|
| DE | 4205265 C1 | 8/1993 | |
| DE | 102018103589 A1 * | 8/2019 | ........... F02N 15/023 |
| EP | 0347429 B1 | 1/1996 | |
| EP | 2371487 B1 | 9/2014 | |
| GB | 1568210 A * | 5/1980 | .............. F16B 21/04 |

* cited by examiner

*Primary Examiner* — Josh Skroupa
(74) *Attorney, Agent, or Firm* — Andrew Wilford

(57) ABSTRACT

A rotatably driven machine tool has a tool holder rotatable about an axis and having at least one drive-side part and a tool-side part, both parts being detachably connected to each other for picking up and holding a rotary tool. A bayonet connection couples the tool-side part and the drive-side part to each other.

10 Claims, 3 Drawing Sheets

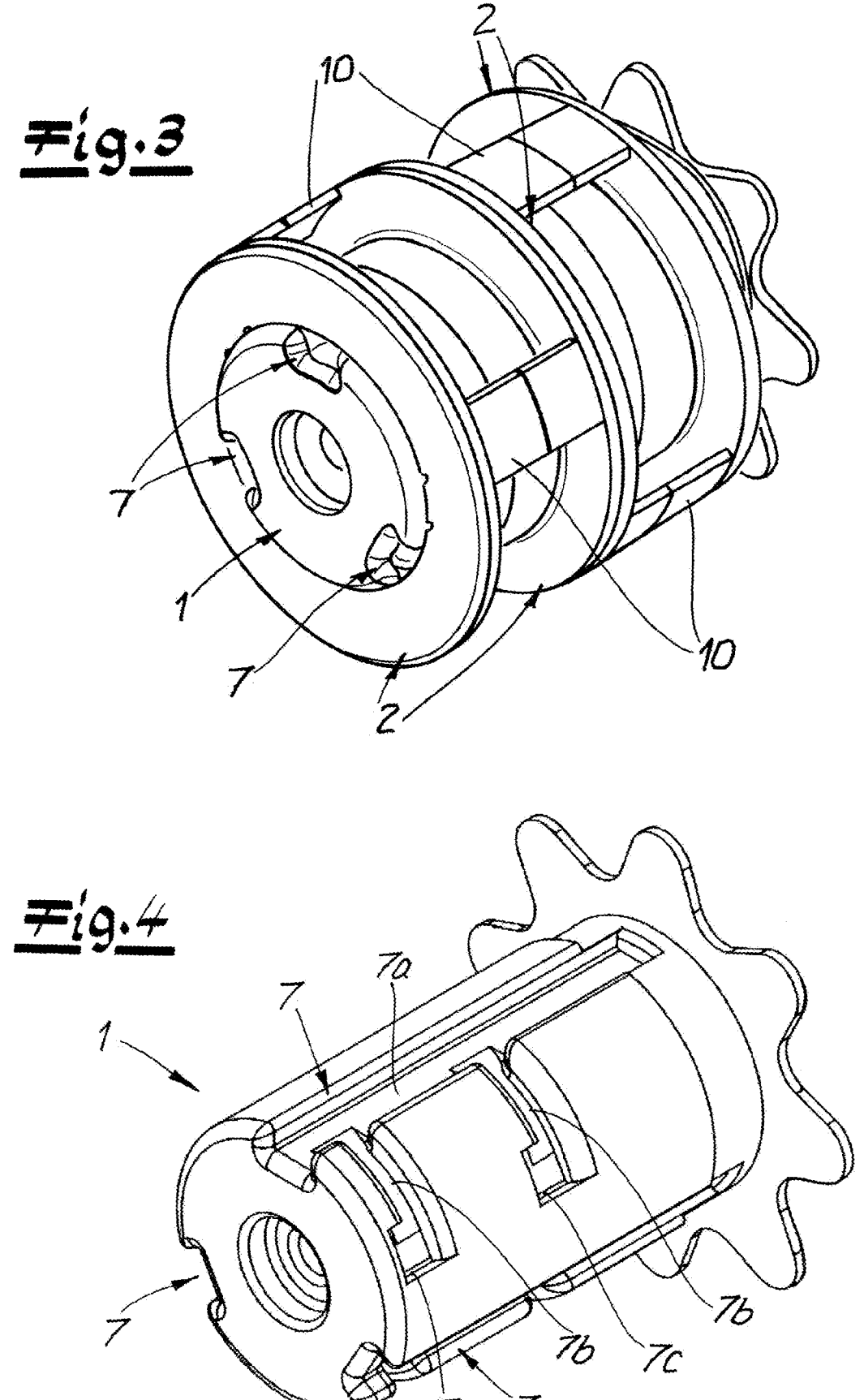

ROTARY MACHINE TOOL

FIELD OF THE INVENTION

The present invention relates to a rotary machine tool. More particularly this invention concerns a power brush for surface treatment.

BACKGROUND OF THE INVENTION

A rotatably driven machine tool, in particular, a rotary power brush, typically has a tool holder having at least one drive-side part and a tool-side part. The two parts are detachably connected to each other for holding a rotary tool.

The drive-side part can be set into rotation, for example, via a mandrel or the like with the aid of a rotary drive. In contrast, the tool-side part is typically used to pick up and hold the rotary tool. As soon as the drive-side part and the tool-side part are detachably coupled to each other, the tool-side part and, thereby, the entire rotary tool can therefore be set into the desired rotation by the rotary drive via the drive-side part.

In the case of a rotatably driven machine tool as described in EP 2 371 487 B1, two specially designed parts are provided and detachably coupled against the force of at least one spring by a locking element. The two parts and the corresponding tool holder are used to hold the rotary tool. The rotary tool can be a rotary brush with a flexible brush band, as described, for example, in the applicant's DE 42 05 265 C1, which is also relevant at this point. In principle, however, a rotary tool in accordance with EP 1 859 903 [U.S. Pat. No. 7,901,274] can also be chucked with the aid of the tool holder.

A comparable rotatably driven machine tool is described in DE 100 30 586 [U.S. Pat. No. 7,192,338]. Here, a tool with a circular disk-shaped tool body is used. The tool body has a central opening for attaching to a machine tool or a rotary drive in general. A support is provided in the opening that engages past the end of the opening at least on one end of the tool body. On the other side of the tool body, a fastener is provided that the machine tool can spread and to which the support can be detachably attached when the fastener is thus spread. As a result, the tool body is axially secured and kept torsionally stable. The well-known support is obviously only suitable in conjunction with circular disk-shaped tools designed as cutting or grinding wheels. Rotary brushes are also known from practice and from the literature in a variety of embodiments. For example, DE 43 26 793 [U.S. Pat. No. 5,524,315] deals with a rotatably driven brush in which the brush holder has two end disks spaced apart by a split spacer bushing and axial lugs mounted at a predetermined spacing from the bushing and angularly distributed around the disk. The ring brush has a flexible brush band with outwardly projecting bristles and bristle-free strips through which pass the axial lugs engaging around the brush band.

In the case of a rotationally driveable machine tool in accordance with EP 0 319 756 [U.S. Pat. No. 5,177,830], two holding disks have concentric annular grooves for tool sleeves that are essentially identical in diameter. In this way, a flawless positioning and stabilization of the respective parted tool sleeve is ensured, particularly dispensing with a rubber core or support bodies or the like. Ultimately, a rotary brush is known from prior art as described in EP 0 347 429 B1 and serves as an example for surface treatment. Thereby, a brush-strip support is provided with a spreadable multipart construction and an expandable annular body that can spring back by the parting unit. The rotary brush also has a brush band with a flat cross-section and that is a closed ring.

The brush-strip holder and the brush band can form a unit. This is intended in order to achieve versatile use, effectiveness and, simultaneously, a long service life.

The prior-art systems cannot be deemed satisfactory in all aspects. For example, within the scope of DE 42 05 265 C1 or also within the scope of DE 43 26 793 C1, each work with a flexible strip of the brush. As a result, movements of the brush band compared to the tool holder are partly deliberately utilized for machining, as described in EP 1 834 733 [U.S. Pat. No. 9,554,642]. In fact, a stop plunging into the rotating bristled ring of the ring brush is provided at this point. The stop slows down the bristles for a certain time so that, after their release, the kinetic energy stored by them is used for the additional machining of a surface of a workpiece through the bristles. This requires a certain movement of the flexible brush band within the tool holder.

In the case of the ring brushes used in practice, in connection with the described rotary tools, the ring brush or its brush band does not precisely "fit" and performs more or less uncontrolled movements compared to the tool holder. As a result, increased wear is often observed leading to destruction of the ring brush during operation.

For this reason, the prior art according to WO 2017/220338 [U.S. Pat. No. 10,807,211], which is also generic and the closest, proceeds in such a way that the tool-side part and the rotary tool form a subassembly. For this purpose, the tool part in question is the rotary tool at least partially radially and axially surrounding holding cage. The drive-side part is a holder adapter that can be detached from the holding cage. For this purpose, the holding adapter has circumferential locking pins that engage into the associated mounting holes in the holding cage in the mounted state of the holding cage on the holding adapter. In principle, this has proven itself and also allows for a quick and low-effort change of the rotary tool to take place.

However, in practice and in the case of significant dirt, problems arise to the extent that the holding adapter with its circumferential locking lugs cannot or can only be detached with difficulty from the holding cage. This can be attributed, for example, to the fact that the coupling lugs are blocked by penetrating dust or dirt for example. In addition, an actuating button that is provided in this context and that acts on the locking pins, is also blocked by dust or penetrating dirt or at least hinders its functionality. Here, the invention remedies this situation.

OBJECTS OF THE INVENTION

It is therefore an object of the present invention to provide an improved rotary machine tool, for instance a power brush.

Another object is the provision of such an improved rotary machine tool that overcomes the above-given disadvantages, in particular such that a quick and functional replacement of the tool-side part with the rotary tool with relation to the drive-side part is possible and easy to do, even when dirty.

SUMMARY OF THE INVENTION

A rotatably driven machine tool has according to the invention a tool holder rotatable about an axis and having at least one drive-side part and a tool-side part, both parts being detachably connected to each other for picking up and holding a rotary tool. A bayonet connection couples the tool-side part and the drive-side part to each other.

This means that, according to the invention, the detachable connection between the two parts is realized and implemented via a bayonet connection. Such a bayonet connection provides a quickly coupled and uncoupled mechanical connection between the drive-side part and the tool-side part. For this purpose, the two elements are inserted into each other and connected to each other or separated from each other by opposite rotation. In order to implement the rotary connection or bayonet connection in question, the drive-side part is typically cylindrical, while the tool-side part is a complementary cylindrical sleeve or disk.

In detail, it is provided that the drive-side part has at least one guide groove and the tool-side part has at least one coupling lug engaging with the guide groove. However, this can also be done the other way around. In this case, the drive-side part is provided with the at least one lug that in turn engages into the guide groove in the tool-side part. The guide groove as a component of the bayonet connection is usually formed at least in two parts with an axially extending groove and an angularly extending groove. In most cases, the design is then such that the angular groove ends at a detent groove at an outer end. The detent groove is favorably formed as blind groove extending parallel to the axial groove.

That means that the guide groove on the drive-side part is generally formed in three parts with the axial groove, the angular groove, and the detent groove provided at an outer end of the angular groove. In this way, there is a combined movement during the union between the drive-side part and the tool-side part in such a way that the tool-side part is first inserted with its lug into the axial groove. This usually occurs against the force of at least one spring that biases the tool-side part. This results in a push movement.

As soon as the lug engaging into the axial groove has reached a certain position or a stop in the axial groove, rotation of the tool-side part takes place as a "turn" with relation to the drive-side part. Finally, at an outer end of the angular groove, the spring that biases the tool-side part ensures that the lug engages into the blind detent groove extending parallel to the axial groove. This results in a snap lock of the tool-side part with relation to the drive-side part in the sense of "locking."

Consequently, the coupling between the drive-side part and the tool-side part occurs via the bayonet connection in the sense of "press/turn detent locking" or "push-turn locking." Since such a bayonet connection can be provided with relatively large play between the groove on the one hand and, on the other, the lug that is guided and held in the groove, the detachable connection between the tool-side and the drive-side part can be established and released again even if the bayonet connection has more or less significant dirt. For this purpose, it is only necessary to complete the previously described steps. Overall, this is achieved without tools and also without the application of an actuating button, which may possibly get blocked up or is hard to press, in such a way that, with relation to prior art according to WO 2017/220338 A1, significant advantages are observed during operation, especially when dirty. This is where the main advantages can be seen.

The spring that biases the tool-side part is usually a coil spring surrounding the drive-side part. In this way, the coil spring with a circumferential circular turn rests on the tool-side part and does not hinder its axial movement along the axial groove or the radial movement along the angular groove when making the bayonet connection. This applies, in particular, in the event that the coil spring in question is made of metal, in particular, steel and the tool-side part is made of plastic or also metal for example. This is because, particularly low friction is then observed in this context. Overall, the spring in question ensures that the tool-side part is held in the blind groove or detent groove with its lug after being coupled with the drive-side part.

A particularly favorable embodiment is characterized in that the drive-side part is provided with three angularly spaced guide grooves. This leads to a mutual coupling between the two parts, taking into account three fixed points realized in this way, which are adjusted by the tool-side part typically also having three lugs distributed across its circumference for engaging into the grooves. As soon as these lugs engage into the detent grooves when the two parts are joined, the tool-side part is aligned with the drive-side part at three fixed points in such a way that the brushes of the part as a whole are statically determined, and there are no tilting movements. This is particularly important for the subsequent rotational biasing.

In accordance with a further favorable embodiment, the tool-side part and the rotary tool form a subassembly. This ensures particularly easy assembly and storage. For this purpose, the tool-side part in question may be a holding cage at least partially radially and axially surrounding the tool, as this is basically described in detail in prior art in accordance with WO 2017/220338 A1. Of course, this is only exemplary and is by no means obligatory.

In addition, it has proven itself in this context if the holding cage is provided as a circular ring cage with angularly spaced axial bars that engage around the respective rotary tool. The axial bars are typically designed in such a way that they engage in recesses of the rotary tool. In addition, the holding cage and, consequently, the tool-side part as a whole can be provided with a central bore for the lugs extending into it. That means that the one or the plurality of lugs extend radially toward an axial center point of the central bore of the tool-side part, or the holding cage favorably provided there. Finally, the design is such that the drive-side part is connected to a rotary drive together with a stop. The rotary drive sets the drive-side part into rotation(s). The same applies to the tool-side part, including the rotary tool, which can be detached here, because the tool-side part and the rotary tool usually form a subassembly. With the aid of the stop, the rotary tool can now be biased in such a way that, for example, individual bristles are braked with its aid and come into contact with a surface to be processed with elevated kinetic energy after passing the stop. This is described in detail in the applicant's EP 1 834 733 B1, to which reference is expressly made in this context.

As a result, a rotatably driven machine tool is provided, that, thanks to its bayonet connection between the tool-side part and the drive-side part, provides a detachable connection that can be easily and quickly coupled and decoupled without the use of tools. This also applies in particular taking into account harsh working conditions and expressly also if one or both of the mentioned parts are more or less dirty. This is where the main advantages can be seen.

BRIEF DESCRIPTION OF THE DRAWING

The above and other objects, features, and advantages will become more readily apparent from the following description, reference being made to the accompanying drawing in which:

FIG. 3 shows a modified embodiment of the rotary machine tool in accordance with FIGS. 1 and 2;

FIG. 4 shows the drive-side part for the rotary tool of FIG. 3; and

SPECIFIC DESCRIPTION OF THE INVENTION

Figure 1:
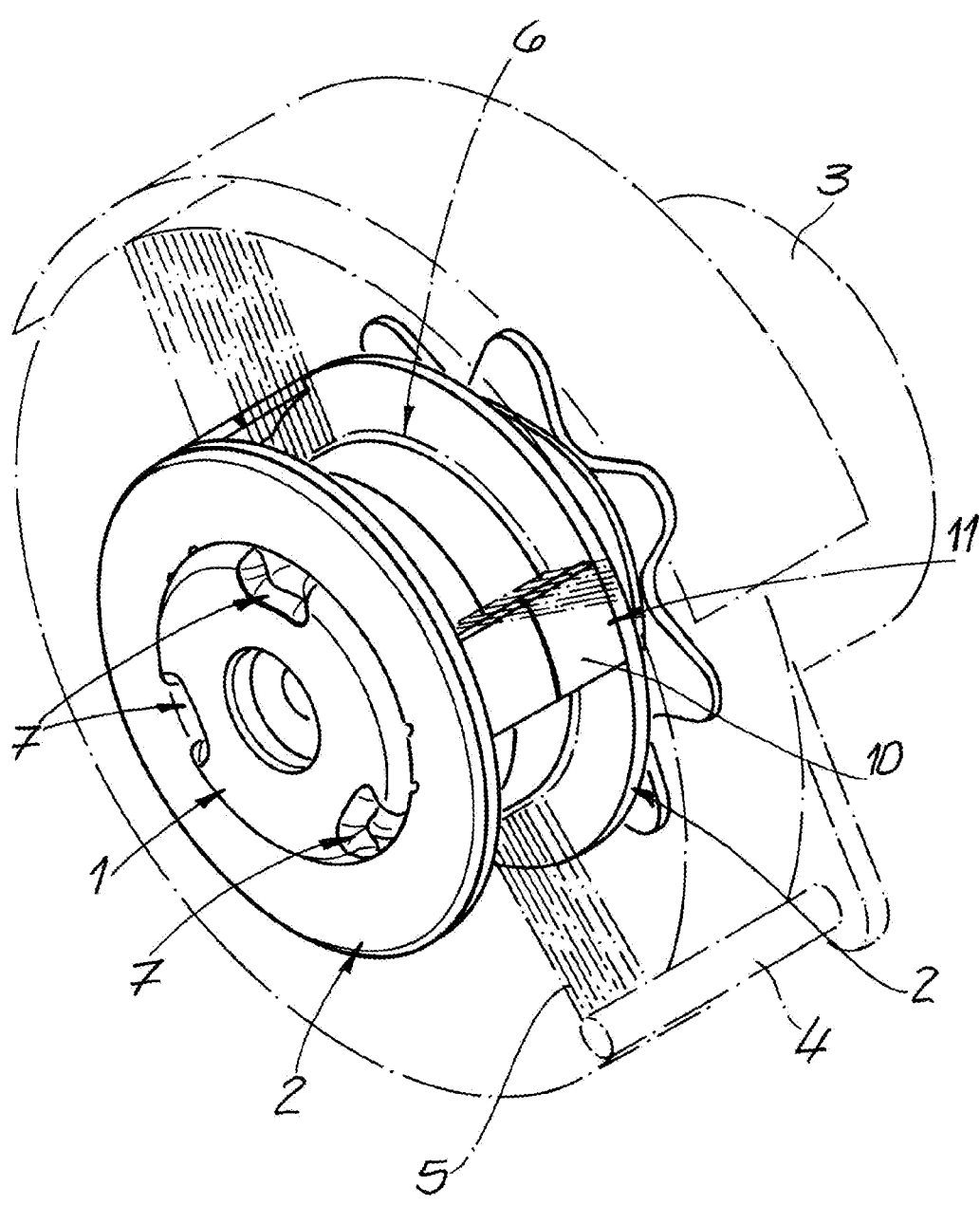
FIG. 1 is a perspective view of the rotatably driven machine tool.

The drawing shows a rotatably driven machine tool. The rotary tool is here a rotary power brush suitable for descaling, removing paint, and similar tasks. The device shown basically has a tool holder 1, 2 formed by at least one drive-side part 1 and a tool-side part 2.

Figures 2, 5:
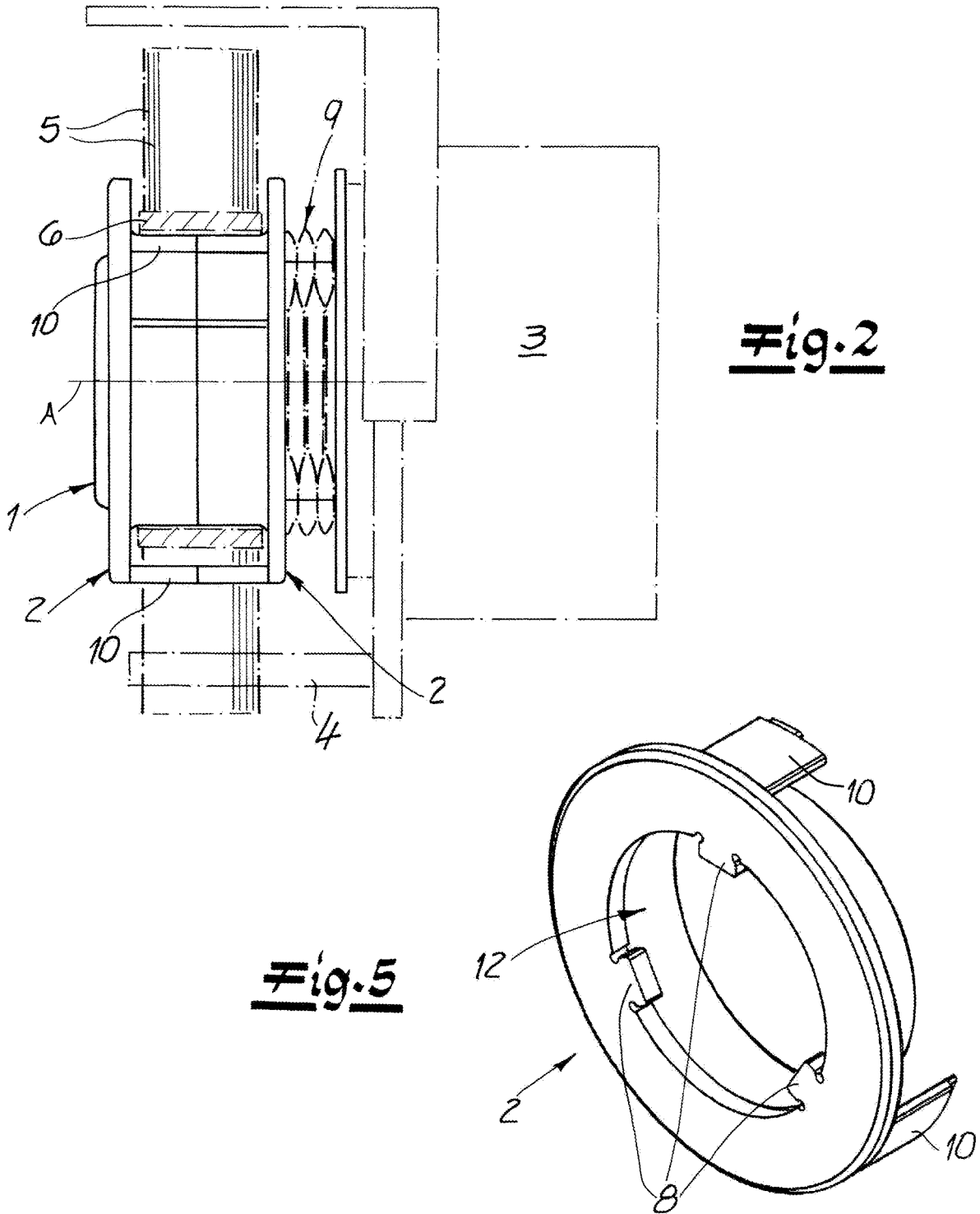
FIG. 2 is a side view of the machine tool of FIG. 1.
FIG. 5 shows the tool-side part for the rotary tool in accordance with FIGS. 3 and 4.

The drive-side part 1 is here a cylindrical holder 1 centered and shown in FIG. 4 in detail and is rotated about a rotation axis A by a rotary drive 3 shown schematically only in FIG. 2. For this purpose, the rotary drive 3 may project through a central bore of the drive-side part or the cylindrical holding adapter 1 or engage into it.

FIG. 2 shows that, for this purpose and according to the embodiment, the drive-side part 1 and a stop 4 are connected to the rotary drive in question 3. The stop 4 may interact with a rotary tool 5, 6 for this purpose, here a rotary ring brush 5, 6 itself composed of an annular brush band 6 and an array of radially projecting bristles anchored in the brush band 6, normally with the array forming three angularly spaced gaps 11. This can best be understood from the side view or partial cross-sectional illustration in accordance with FIG. 2.

According to the invention, the design is such that the drive-side part 1 and the tool-side part 2 are detachably connected to each other when holding the rotary tool 5, 6 in question. A bayonet connection 7, 8 detachably connects together the two parts 1, 2, as seen by a comparison of FIGS. 4 and 5.

In fact, for this purpose, the drive-side cylindrical part 1 is provided with at least one radially outwardly open guide groove 7. On the other hand, the tool-side part 2 has at least one radially inwardly projecting coupling lug 8 engageable into the guide groove 7, as clear from in FIG. 5. In principle, it can also be done the other way around. In this case, the drive-side part 1 is provided with the lug 8 and the tool-side part 2 has the guide groove 7.

FIG. 4 shows how the guide groove 7 consists of at least two parts, here three parts. In fact, the guide groove 7 consists of an axially extending groove 7*a* and a subsequent radially extending groove 7*b* extending angularly of the axis A from the axial groove 7*a*. In addition, it has an outer-end detent groove 7*c* extending from an end of the angular groove remote from the axial groove 7*a*. The detent groove 7*c* is a blind groove and extends parallel to the axial groove 7*a* so that it has a closed outer end.

The further basic structure then includes a spring 9, which is particularly shown in FIG. 2. The spring 9 is a coil spring 9 surrounding the drive-side part 1 and pressing the parts axially away from each other. The coil spring 9 ensures that the tool-side part 2 is held in the detent groove 7*c* after connection to the drive-side part 1 with its lug 8. For this purpose, the drive-side part 1 is usually provided with three grooves 7 distributed uniformly about its circumference. Accordingly, the tool-side part 2 complementarily has three angularly spaced lugs 8 for engaging into the respective guide grooves 7.

In addition, the design is such that the tool-side part 2 and the rotary tool 5, 6 form a subassembly 2, 5, 6, as best seen from the side lateral view or partial section of FIG. 2. In addition, for this purpose the tool-side part 2 is a holding cage at least partially radially and axially surrounding the ring brush 5, 6. In accordance with the embodiment, the holding cage 2 is formed in several parts, namely being composed of a plurality of interconnectable parts 2. In accordance with the embodiment, the holding cage 2 is a circular ring cage with angularly spaced and axially extending bars 10 that engage around the rotary tool 5, 6, fitting through the gaps 11 in the annular array of bristles 5.

The holding cage 2 or generally the tool-side part 2 is provided overall and in accordance with the view of FIG. 5 with a central bore 12 into which one of or all three angularly spaced lugs 8 extend. This central bore 12 is centered on the axis A.

In order to now couple the tool-side part 2 with the drive-side part 1 that in turn is connected to the rotary drive 3, the tool-side part or the holding cage 2 with its central bore 12 is fitted together with the drive-side part 1 or the cylindrical lug in such a way that the individual lugs 8 engage into the central bore 12 in the respective grooves 7. The lugs 7 slide along the respective axial groove 7*a*. This occurs against the force of the spring 9.

As soon as the lug 8 in question has reached the angular groove 7*b*, the tool-side part 2 can at the end of the axial movement be twisted to lock with the drive-side part 1. At the end of this rotational movement, the lugs 8 move into the detent grooves 7*c,* biased by the spring 9, in such a way that, after full coupling of the bayonet connection 7, 8, the tool-side part 2 and, along with it, the rotary tool 5, 6 or the unit 2, 5, 6 realized at this point is locked to the drive-side part 1. For any detachment of the tool-side part 2 with relation to the drive-side part 1, the described process must be carried out in reverse.

We claim:

1. A rotatably driven machine tool comprising:
   a rotary tool centered on an axis and formed with angularly spaced and radially outwardly open gaps;
   a cylindrical drive-side part and centered on the axis;
   a tool-side part formed of a cylindrical sleeve and a circular ring centered on the axis and formed as a ring cage having angularly spaced and axially extending bars at least partially radially and axially surrounding the rotary tool with the bars in the gaps and having at least one radially inwardly projecting lug, both parts being detachably connected couplable to each other for picking up and holding the rotary tool;
   a bayonet connection detachably coupling the tool-side part and the drive-side part to each other for joint rotation and formed by the lug of the tool-side part and a complementary outwardly open guide groove of the drive-side part; and
   a rotary drive connected to the drive-side part for rotating the drive-side part, the tool-side part, and the rotary tool.

2. The machine tool according to claim 1, wherein the guide groove has an axial groove and an angular groove extending from the axial groove.

3. The machine tool according to claim 2, wherein the guide groove further has a detent groove at an outer end of the angular groove.

4. The machine tool according to claim 3, wherein the detent groove is a blind groove extending from the outer end of the angular groove parallel to the axial groove.

5. The machine tool according to claim 1, further comprising:

at least one spring compressed axially between the parts.

6. The machine tool according to claim 5, wherein the spring is a coil spring surrounding at least a portion of the drive-side part.

7. The machine tool according to claim 5, wherein the spring biases the tool-side part axially into the detent groove when the lug is fully engaged in the guide groove of the drive-side part.

8. The machine tool according to claim 1, wherein the drive-side part is provided with three of the guide grooves angularly spaced relative to a rotation the axis of the parts.

9. The machine tool according to claim 8, wherein the tool-side part has three of the lugs angularly spaced from one another for engaging into respective ones of the guide grooves.

10. The machine tool according to claim 1, wherein the drive-side part and a bristle stop are mounted on the rotary drive.

* * * * *